United States Patent [19]

Funahashi

[11] Patent Number: 4,806,759
[45] Date of Patent: Feb. 21, 1989

[54] METHOD OF ADJUSTING RADIATION IMAGE READ-OUT CONDITIONS

[75] Inventor: Takeshi Funahashi, Kanagawa, Japan

[73] Assignee: Fuji Photo Film Co., Ltd., Kanagawa, Japan

[21] Appl. No.: 917,120

[22] Filed: Oct. 9, 1986

[30] Foreign Application Priority Data

Oct. 9, 1985 [JP] Japan .................................. 60-225868
Oct. 18, 1985 [JP] Japan .................................. 60-232511

[51] Int. Cl.$^4$ ......................... G01N 23/04; H04N 5/30
[52] U.S. Cl. ................................. 250/327.2; 250/484.1
[58] Field of Search ......................... 250/327.2, 484.1; 364/414; 382/22, 19, 54; 358/284, 283, 282

[56] References Cited

U.S. PATENT DOCUMENTS 4,074,231  2/1978  Yajima et al. ..................... 382/54
4,360,883  11/1982 Ejiri et al. ........................ 358/284
4,437,122  3/1984  Walsh et al. ...................... 382/54
4,519,041  5/1985  Fant et al. ........................ 382/54
4,564,861  1/1986  Hishinuma et al. ............... 378/162

OTHER PUBLICATIONS

Jackson, P. "Image Contract Enhance by Local Max & Local Min. Operations", IBM Tech Dis Bull, vol. 24, #12 May 1982.

Primary Examiner—Janice A. Howell
Assistant Examiner—Richard Hanig
Attorney, Agent, or Firm—Sughrue, Mion, Zinn, Macpeak & Seas

[57] ABSTRACT

In a method of adjusting read-out conditions for a radiation image stored on a stimulable phosphor sheet by limiting the irradiation field, digital image signals at respective positions on the stimulable phosphor sheet are detected from image information obtained by preliminary read-out. A difference image constituted by difference values between the digital image signals is created and scanned in one direction to detect a section intecepted between a difference value not smaller than a threshold value $+Th$ and a difference value not larger than $-Th$ on each scanning line. Or, the difference image is scanned in two or more directions to detect a range comprising a group of the intercepted sections on scanning lines in each of the scanning directions. The read-out conditions in final read-out are adjusted based on the preliminary read-out image information within the section on each scanning line or within an irradiation field region determined based on the ranged detected in the respective scanning directions.

6 Claims, 5 Drawing Sheets

METHOD OF ADJUSTING RADIATION IMAGE READ-OUT CONDITIONS

BACKGROUND OF THE INVENTION

1. Field of the Invention

This invention relates to a method of adjusting radiation image read-out conditions in a radiation image recording and reproducing system for radiation images stored on a stimulable phosphor sheet, for medical diagnosis or the like.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored thereon, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic film or on a display device such as a cathode ray tube (CRT).

One embodiment of the aforesaid radiation image recording and reproducing system is disclosed, for example, in Japanese Unexamined Patent Publication No. 58(1983)-67240. In the embodiment, before final read-out is conducted by scanning the stimulable phosphor sheet carrying a radiation image of an object stored thereon by stimulating rays which cause the stimulable phosphor sheet to emit light in proportion to the radiation energy stored, detecting the emitted light by a photoelectric read-out means and converting it into an electric image signal, preliminary read-out for approximately detecting the image information stored on the stimulable phosphor sheet is conducted by use of stimulating rays of a level lower than the level of the stimulating rays used in the final read-out. Read-out conditions for the final read-out are adjusted on the basis of the information obtained by the preliminary read-out, and the final read-out is conducted by use of the read-out conditions. The electric image signal obtained by the final read-out is sent to an image processing means and is processed in accordance with the image recording portion of the object and/or the image recording method to obtain a visible image suitable for viewing, particularly for diagnostic purposes. The processed image signal is used to reproduce the visible image on a photographic film or the like.

By the term "read-out conditions" as used herein are meant various conditions affecting the relationship between the amount of the light emitted by the stimulable phosphor sheet at the read-out step and the output of the read-out apparatus, for example, the read-out gain (sensitivity) determining the relationship between the input and the output of the read-out apparatus, the scale factor (latitude), and the power of the stimulating rays used for read-out.

As described above, the level of the stimulating rays used in the preliminary read-out is lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read-out, or the stimulating rays emitted by the stimulating ray source may be attenuated by an ND filter, an AOM, or the like, positioned in the optical path. Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

When the image information stored on the stimulable phosphor sheet is approximately detected prior to the final read-out and the final read-out is conducted by use of the read-out conditions adjusted on the basis of the image information, it becomes possible to eliminate adverse effects of a fluctuation in the level of the radiation energy stored on the stimulable phosphor sheet, which is caused by a change in the object or the image recording portion thereof, by a fluctuation in the radiation dose, or the like, and to conduct the final read-out by use of desirable read-out conditions.

As the method of adjusting the read-out conditions in the final read-out on the basis of the image information obtained by the preliminary read-out, the applicant proposed in Japanese Patent Application No. 59(1984)-12658 a novel method comprising the steps of: determining a histogram of the amount of light emitted by a stimulable phosphor sheet in preliminary read-out, calculating the maximum light emission amount Smax and the minimum light emission amount Smin of a desired image information range in the histogram, and adjusting the read-out conditions in final read-out so that the maximum light emission amount Smax and the minimum light emission amount Smin correspond respectively to the maximum signal level Qmax and the minimum signal level Qmin of a desired input signal range in the image processing means which are determined by the maximum density Dmax and the minimum density Dmin of a correct density range in the reproduced visible image.

On the other hand, in the case where the radiation image recording and reproducing system is used for medical diagnosis, portions of the human body not related to diagnosis should not be exposed to radiation since the radiation is harmful to the human body. Further, when the human body portions not related to diagnosis are exposed to radiation, the radiation is scattered by such portions to the portion related to the diagnosis, and the contrast and resolution are adversely affected by the scattered radiation. Therefore, in many cases, the irradiation field should be limited when a radiation image is recorded. Normally, when the irradiation field is limited, radiation scattered by the object within the irradiation field passes outside of the irradiation field. The scattered radiation is absorbed and stored on the stimulable phosphor sheet which exhibits high sensitivity, and therefore the histogram of the light emission amount obtained by the preliminary read-out includes the light emission amount caused by the scattered radiation. Since the light emission amount caused by the scattered radiation outside of the irradiation field on the stimulable phosphor sheet is often equal to or larger than the light emission amount within the irradiation field, it is not always possible to discriminate between the light emission amounts inside and outside of the irradiation field in the histogram obtained by the preliminary read-out. As a result, when Smax and Smin are calculated from the histogram as described above and the read-out conditions are adjusted on the basis of Smax and Smin, the minimum light emission amount within the irradiation field is not detected as Smin, and that caused by the scattered radiation outside of the irradiation field is detected as Smin. In general, the minimum light emission amount outside of the irradiation field is smaller than that within the irradiation field. Accordingly, when the minimum light emission amount outside of the irradiation field is detected as Smin, signals caused by the scattered radiation not related to diagnosis are taken within a low density range in the final read-out, and the density of the image of the portion related to diagnosis becomes too high. As a result, the image contrast decreases and it becomes difficult to make an accurate diagnosis.

Namely, when a radiation image is recorded by limiting the irradiation field, radiation scattered by the object passes outside of the irradiation field on the stimulable phosphor sheet and causes noise in the image information obtained by the preliminary read-out. Therefore, when the read-out conditions are adjusted based on such preliminary read-out image information, it is not always possible to adjust the read-out conditions to appropriate values and to obtain a visible image suitable for viewing, particularly for diagnostic purposes.

SUMMARY OF THE INVENTION

The primary object of the present invention is to provide a method of adjusting radiation image read-out conditions for final read-out to appropriate values on the basis of image information obtained by preliminary read-out, wherein problems caused by irradiation field limitation are eliminated when image recording is conducted by limiting the irradiation field.

Another object of the present invention is to provide a method of adjusting radiation image read-out conditions wherein an irradiation field region closer to the true irradiation field is detected on the basis of image information obtained by preliminary read-out, whereby the read-out conditions are adjusted to appropriate values.

The present invention provides a method of adjusting radiation image read-out conditions in which preliminary read-out conducted by exposing a stimulable phosphor sheet carrying a radiation image of an object stored thereon by limitation of an irradiation field to stimulating rays of a level lower than the level of stimulating rays used in final read-out and detecting the radiation image stored on the stimulable phosphor sheet is carried out prior to the final read-out wherein the stimulable phosphor sheet is exposed to stimulating rays which cause the stimulable phosphor sheet to emit light in proportion to the stored radiation energy and the emitted light is photoelectrically detected to obtain electric image signals used for reproducing a visible image, and read-out conditions in the final read-out are adjusted on the basis of the image information obtained by the preliminary read-out, wherein the improvement comprises the steps of:

(i) detecting digital image signals at respective positions on said stimulable phosphor sheet on the basis of the image information obtained by said preliminary read-out, (ii) subjecting said digital image signals to a difference processing for calculating differences between said digital image signals, and creating a difference image constituted by the difference values, (iii) preparing a predetermined threshold value Th, scanning said difference image or a processed difference image, which is obtained by subjecting said difference image to a predetermined processing, in a single scanning direction, thereby detecting a predetermined section intercepted between a position where a difference value equal to or larger than $+Th$ is present and a position where a difference value equal to or smaller than $-Th$ is present on each scanning line, and (iv) adjusting said read-out conditions in said final read-out on the basis of the image information obtained within said predetermined section on each scanning line by said preliminary read-out.

The present invention also provides a method of adjusting radiation image read-out conditions as mentioned above, wherein the improvement comprises the steps of:

(i) detecting digital image signals at respective positions on said stimulable phosphor sheet on the basis of the image information obtained by said preliminary read-out, (ii) subjecting said digital image signals to a difference processing for calculating differences between said digital image signals, and creating a difference image constituted by the difference values, (iii) preparing a predetermined threshold value Th, scanning said difference image or a processed difference image, which is obtained by subjecting said difference image to a predetermined processing, in at least two scanning directions, thereby detecting a predetermined range formed by a group of predetermined sections intercepted between a position where a difference value equal to or larger than $+Th$ is present and a position where a difference value equal to or smaller than $-Th$ is present on respective scanning lines in each of said at least two scanning directions, and (iv) adjusting said read-out conditions in said final read-out on the basis of the image information obtained by said preliminary read-out within an irradiation field region determined based on the predetermined ranges detected in the respective scanning directions.

In the method of adjusting radiation image read-out conditions in accordance with the present invention mentioned first, a difference image is created by conducting a difference processing on the digital image signals (preliminary read-out image information) at the respective positions on the stimulable phosphor sheet.

The difference image or a processed difference image obtained by a predetermined processing thereof is scanned in a single scanning direction to detect a predetermined section intercepted between a position where a difference value equal to or larger than a predetermined threshold value +Th is present and a position where a difference value equal to or smaller than −Th is present on each scanning line. The read-out conditions in the final read-out are adjusted based on the preliminary read-out image information within the predetermined section on each scanning line.

The predetermined sections on the respective scanning lines correspond to sections inside of the irradiation field on the respective scanning lines. Therefore, adjustment of the read-out conditions in the final read-out based on the preliminary read-out image information within the respective sections is equivalent to the adjustment of the read-out conditions in the final read-out based only on the preliminary read-out image information inside of the irradiation field.

Accordingly, with the method of adjusting radiation image read-out conditions in accordance with the present invention mentioned first, in the case where image recording is conducted by limiting the irradiation field, it is possible to adjust the read-out conditions in the final read-out based only on the preliminary read-out image information within the irradiation field, i.e. by eliminating adverse effects of scattered radiation impinging upon sheet portions outside of the irradiation field. Thus it becomes possible to always adjust the read-out conditions in the final read-out to appropriate values.

In the method of adjusting radiation image read-out conditions in accordance with the present invention mentioned last, the difference image or a processed difference image obtained by a predetermined processing thereof is scanned in at least two scanning directions to detect a predetermined range constituted by a group of predetermined sections intercepted between a position where a difference value equal to or larger than a predetermined threshold value +Th is present and a position where a difference value equal to or smaller than −Th is present on respective scanning lines in each of said at least two scanning directions. The read-out conditions in the final read-out are adjusted based on the preliminary read-out image information within an irradiation field region determined based on the predetermined ranges detected in the respective scanning directions.

Thus, since the irradiation field region is detected and the read-out conditions in the final read-out are adjusted based on the preliminary read-out image information inside of the irradiation field region, it is possible to eliminate adverse effects of scattered radiation impinging upon sheet portions outside of the irradiation field and to always adjust the read-out conditions in the final read-out to appropriate values.

Also, since the predetermined sections on the respective scanning lines correspond to sections inside of the irradiation field on the respective scanning lines, the predetermined ranges constituted by groups of the predetermined sections should coincide with the true irradiation field. Actually, however, they do not necessarily coincide exactly with each other for various reasons. With the method of the present invention mentioned last, since the predetermined ranges obtained by scanning in at least two different directions are used and the irradiation field is determined by combining the predetermined ranges, it becomes possible to determine a irradiation field region that is closer to the true irradiation field.

DESCRIPTION OF THE PREFERRED EMBODIMENTS

The present invention will hereinbelow be described in further detail with reference to the accompanying drawings.

Figures 1, 2:
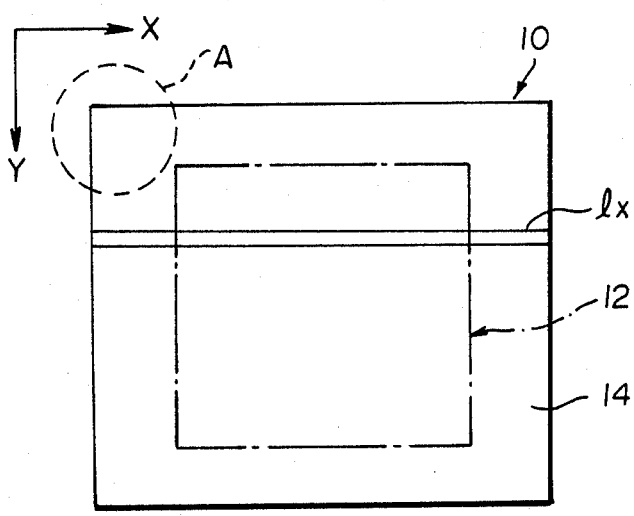
FIG. 1 is a schematic view showing the stimulable phosphor sheet carrying a radiation image stored thereon by limitation of the irradiation field.
FIG. 2 is an enlarged view of a portion A of FIG. 1 and shows digital image signals at respective positions on the stimulable phosphor sheet.

The embodiment of the method of adjusting radiation image read-out conditions in accordance with the present invention described below is for the case where image read-out is conducted on a stimulable phosphor sheet 10 carrying a radiation image stored thereon by limitation of the irradiation field into a rectangular form 12 as shown in FIG. 1. In FIG. 1, an X axis and a Y axis are set along two adjacent sides of the contour of the rectangular irradiation field 12 on the stimulable phosphor sheet 10. In general, in the case of the rectangular irradiation field, the irradiation field is limited so that respective sides of the contour of the rectangular irradiation field are parallel to the respective sides of the stimulable phosphor sheet 10. Therefore, it may be considered that the X axis and the Y axis are set along two adjacent sides of the stimulable phosphor sheet 10.

In this embodiment, the image information stored on the stimulable phosphor sheet 10 shown in FIG. 1 is first detected by conducting the preliminary read-out as mentioned above.

By "detecting image information from the stimulable phosphor sheet 10 by preliminary read-out" is meant scanning the stimulable phosphor sheet 10 with preliminary read-out stimulating rays which cause the stimulable phosphor sheet 10 to emit light in proportion to the stored radiation energy, detecting the emitted light by a photoelectric conversion means, and obtaining information constituted by electric signals corresponding to light emission amounts at respective scanning points, i.e. respective picture elements, on the stimulable phosphor sheet 10.

Then, digital image signals at respective positions on the stimulable phosphor sheet 10 are obtained from the preliminary read-out image information detected by the preliminary read-out. The digital image signals may be obtained directly from the preliminary read-out image information detected by the preliminary read-out, or may be obtained by carrying out a pre-processing such as spatial filter processing on the image information.

In the case where the digital image signals are obtained directly, position setting on the stimulable phosphor sheet 10 may be conducted in the unit of the picture element, and a signal obtained by digitizing the preliminary read-out image information at the picture element corresponding to each position may be used as the digital image signal at said position.

In the case where the digital image signals are obtained by conducting a pre-processing such as spatial filter processing on the preliminary read-out image information, for example, a plurality of picture elements in specific relation to each other may be set as one position, and the digital image signal at said position may be calculated based on the preliminary read-out image information at the picture elements included in said position, for example, by arithmetic averaging of the preliminary read-out image information. Or, position setting on the stimulable phosphor sheet 10 may be conducted in the unit of the picture element, and the digital image signal at said position may be calculated based on the preliminary read-out image information at said position and a plurality of picture elements corresponding to the positions around said position.

In this embodiment, the position setting on the stimulable phosphor sheet 10 is conducted in the unit of the picture element, and a signal obtained by digitizing the preliminary read-out image information at the picture element corresponding to each position is used as the digital image signal at said position.

FIG. 2 is an enlarged view showing the portion A of the stimulable phosphor sheet 10 in FIG. 1. In FIG. 2, each cell indicates a single picture element (position), and f(1,1), f(1,2), ... in the respective picture elements represent the digitized preliminary read-out information at respective picture elements (1,1), (1,2), ...

After the digital image signals at the respective positions are obtained as mentioned above, a difference processing is conducted on the digital image signals, and a difference image constituted by difference values is created.

By "difference processing" is meant a processing for calculating a difference value at a predetermined position on the basis of a difference between the digital image signals in a predetermined relation to each other, for example, between the digital image signals at positions adjacent to each other or in the vicinity of said predetermined position. Specifically, the difference processing means a processing for calculating the difference values by use of difference operators as shown in FIGS. 3A to 3F.

Figure 3A:
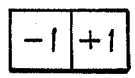
FIGS. 3A to 3F are schematic views showing difference operators.

In the difference processing using the operator shown in FIG. 3A, subtraction is conducted between the digital image signals at positions adjacent to each other in the X axis direction, and the value thus calculated is used as the difference value. For example, in FIG. 2, a digital image signal f(3,3) at a position (3,3) is subtracted from a digital image signal f(3,4) at a position (3,4), and the value thus calculated is used as the difference value at the position (3,3).

Figure 3B:
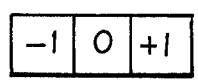

In the difference processing using the operator shown in FIG. 3B, subtraction is conducted between the digital image signals at positions on opposite sides of a predetermined position in the X axis direction, and the value thus calculated is used as the difference value at said predetermined position. For example, in FIG. 2, a digital image signal f(3,2) at a position (3,2) is subtracted from the digital image signal f(3,4) at the position (3,4), and the value thus calculated is used as the difference value at the position (3,3).

Figure 3C:
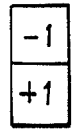

In the difference processing using the operator shown in FIG. 3C, subtraction is conducted between the digital image signals at positions adjacent to each other in the Y axis direction, and the value thus calculated is used as the difference value. For example, in FIG. 2, the digital image signal f(3,3) at the position (3,3) is subtracted from a digital image signal f(4,3) at a position (4,3), and the value thus calculated is used as the difference value at the position (3,3).

Figure 3D:
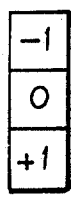

In the case of the difference processing using the operator shown in FIG. 3D, subtraction is conducted between the digital image signals at positions on opposite sides of a predetermined position in the Y axis direction, and the value thus calculated is used as the difference value at said predetermined position. For example, in FIG. 2, a digital image signal f(2,3) at a position (2,3) is subtracted from the digital image signal f(4,3) at the position (4,3), and the value thus calculated is used as the difference value at the position (3,3).

Figure 3E:
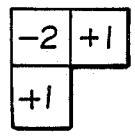

In the case of the difference processing using the operator shown in FIG. 3E, processing is conducted by simultaneously using the operator shown in FIG. 3A and the operator shown in FIG. 3C. For example, in FIG. 2, the value calculated by subtracting the digital image signal f(3,3) at the position (3,3) from the digital image signal f(3,4) at the position (3,4) is added to the value calculated by subtracting the digital image signal f(3,3) at the position (3,3) from the digital image signal f(4,3) at the position (4,3), and the sum thus calculated is used as the difference value at the position (3,3).

Figure 3F:
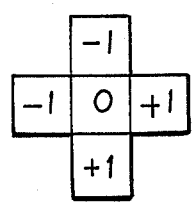

In the case of the difference processing using the operator shown in FIG. 3F, processing is conducted by simultaneously using the operator shown in FIG. 3B and the operator shown in FIG. 3D. For example, in FIG. 2, the value calculated by subtracting the digital image signal f(3,2) at the position (3,2) from the digital image signal f(3,4) at the position (3,4) is added to the value calculated by subtracting the digital image signal f(2,3) at the position (2,3) from the digital image signal f(4,3) at the position (4,3), and the sum thus calculated is used as the difference value at the position (3,3).

The difference values may be calculated at all positions or only at a part thereof selected appropriately.

In this embodiment, difference values are calculated at all positions by use of the operator shown in FIG. 3A, and a difference image constituted by the difference values is created.

Thereafter, a predetermined threshold value Th is prepared, the difference image created as mentioned above or a processed difference image obtained by appropriately processing the difference image is scanned in a single direction, and a predetermined section intercepted between a position where a difference value equal to or larger than +Th is present and a position where a difference value equal to or smaller than −Th is present on each scanning line is detected.

In this embodiment, the method of detecting the predetermined section by using the processed difference image is employed. Specifically, a threshold value processing wherein the predetermined threshold value Th is used is carried out on the difference values calculated as described above. The difference values are encoded so that a difference value equal to or larger than +Th is taken as +1, a difference value equal to or smaller than −Th is taken as −1, and the other difference value, i.e. a difference value smaller than +Th and larger than −Th, is taken as 0. The processed difference image obtained by the threshold value processing and constituted by the threshold value-processed difference values thus encoded is scanned in the X axis direction. When the combination of +1 with −1 is found on each scanning line, the section intercepted between +1 and −1 is detected as the predetermined section on said scanning line.

Figure 4:
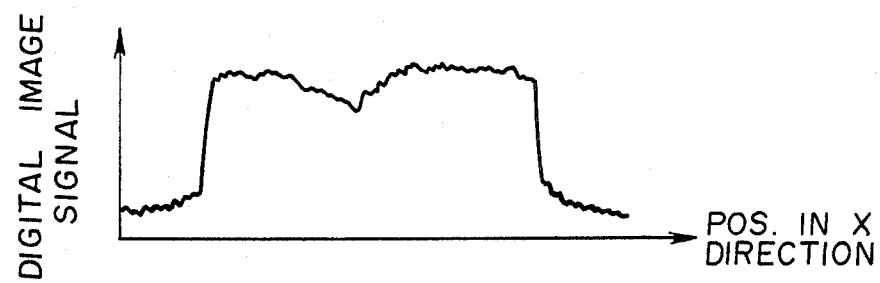
FIG. 4 is a graph showing the digital image signals on the line lx in FIG. 1.
Figure 5:
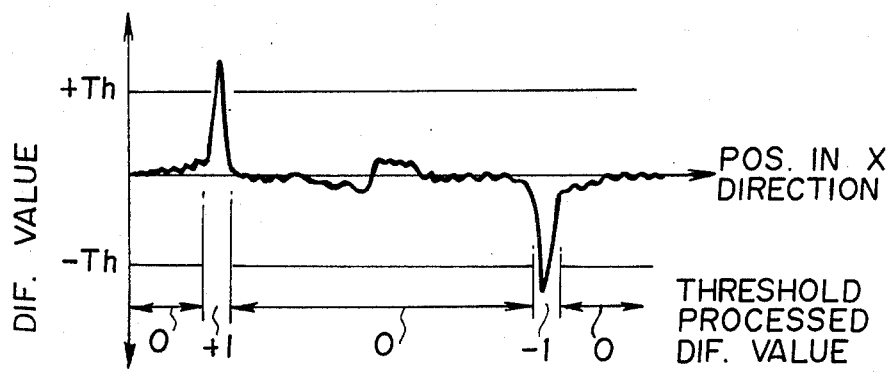
FIG. 5 is a graph showing the difference values obtained by a difference processing of the digital image signals shown in FIG. 4, FIGS. 6, 7 and 8 are schematic views showing the difference images created by use of various difference operators.
Figure 6:
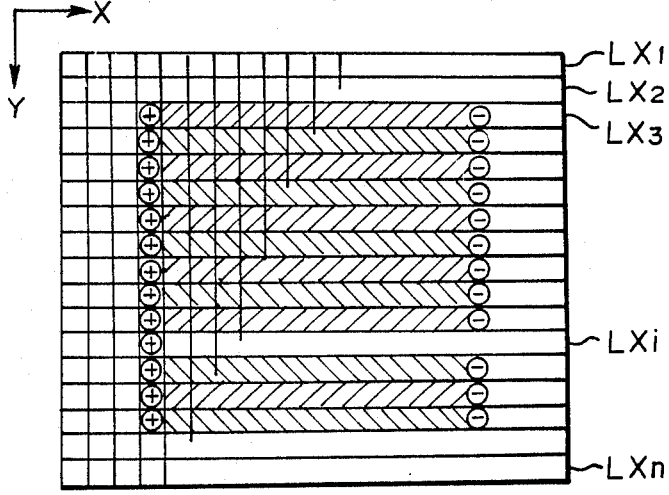

FIG. 4 is a graph showing the digital image signals on an arbitrary line lx in the X axis direction in FIG. 1, and FIG. 5 is a graph showing the difference values obtained by the difference processing of the digital image signals shown in FIG. 4 wherein the difference operator shown in FIG. 3A is used, and the threshold value processing for converting the difference values into the three-valued system. FIG. 6 shows the threshold value-processed difference image which is constituted by the threshold value-processed difference values (−1, 0, +1) obtained by carrying out the threshold value processing for all lines in the X axis direction. In FIG. 6, the threshold value-processed difference values +1 and −1 are expressed simply as ⊕ and ⊖, and the portion where no ⊕ nor ⊖ is indicated corresponds to the portion where the threshold value-processed difference value is 0.

The digital image signals at the respective positions on the stimulable phosphor sheet 10 are proportional to the level of energy of the radiation impinging upon the sheet 10. Therefore, as shown in FIG. 4, the image signals at a region 14 outside of the irradiation field shown in FIG. 1 are generally of a low quantum level, and the image signals inside of the irradiation field are generally of a high quantum level. Accordingly, as shown in FIG. 5, the difference value between the image signals at a portion where the contour of the irradiation field is present becomes markedly larger or smaller then the difference values at the other portions, and it is possible to detect the positions of the contour of the irradiation field, and consequently the section inside of the irradiation field intercepted between said positions, by detecting the position where the difference value is markedly large and the position where the difference value is markedly small by use of the appropriately predetermined threshold value Th. Thus detection of the predetermined section indicated by hatching in FIG. 6 and intercepted between the position where the difference value is equal to or larger than +Th and the position where the difference value is equal to or smaller than −Th on each of scanning lines LX1, LX2, LX3, . . . , LXi, . . . , LXn as shown in FIG. 6 by scanning the difference image in the X axis direction is equivalent to detection of the section inside of the irradiation field on each scanning line.

In FIG. 6, since the scanning lines LX1 and LX2 are positioned in the region 14 outside of the irradiation field, the difference value equal to or larger than +Th and the difference value equal to or smaller than −Th are not present on these scanning lines. Also, like the scanning line LXi, the combination of the position where the difference value is equal to or larger than +Th with the position where the difference value is equal to or smaller than −Th may not be present even on a line inside of the irradiation field 12. In this case, it is regarded that no predetermined section is detected on the scanning line.

Also when the threshold value processing is conducted in the same manner as mentioned above by using the difference operator shown in FIG. 3B, a difference image similar to that shown in FIG. 6 is obtained, and the predetermined section may be detected by scanning the difference image in the same manner as mentioned above.

Figure 7:
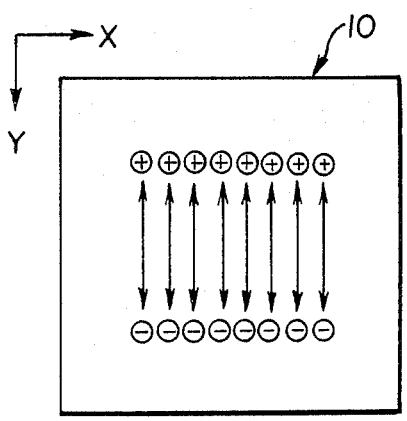

In the case where the difference operator shown in FIGS. 3C or 3D is used, a difference image as shown in FIG. 7 is obtained. In this case, the predetermined section on each scanning line as indicated by the double directed arrows in FIG. 7 may be detected by scanning the difference image in the Y axis direction.

Figure 8:
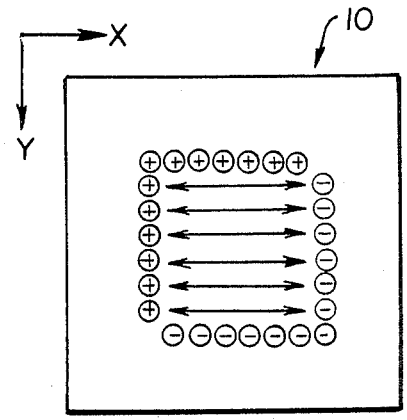

When the difference operator shown in FIGS. 3E or 3F is used, a difference image as shown in FIG. 8 is obtained. In this case, the predetermined section may be detected on each scanning line by scanning the difference image in the X axis direction or in the Y axis direction. In FIG. 8, the double directed arrows are shown to indicate the predetermined sections detected by scanning in the X axis direction.

In sum, in the aforesaid embodiment, the threshold value processing is conducted on the difference image for encoding all difference values so that the difference value equal to or larger than +Th, the difference value equal to or smaller than −Th, and the other difference values may be discriminated from each other. The threshold value-processed difference image constituted by the threshold value-processed difference values (+1, 0, −1) and created by the threshold value processing is scanned to detect the predetermined section. However, it is also possible to use a different processing. For example, a threshold value processing for encoding only a part of the difference values like semi threshold value processing wherein a difference value between +Th and −Th is taken as 0 and the other difference values are not changed may be conducted, and the predetermined section may be detected by scanning the threshold value-processed difference image constituted by the threshold value-processed difference values obtained by said processing.

After the predetermined sections on the respective scanning lines are detected, preliminary read-out image information at the respective predetermined sections is extracted from the preliminary read-out image information already obtained as described above, and the read-out conditions in the final read-out are adjusted based on the extracted preliminary read-out image information.

As mentioned above, the predetermined sections on the respective scanning lines are the sections inside of the irradiation field on the respective scanning lines. Therefore, the total of the extracted preliminary read-out image information at the predetermined sections on the respective scanning lines corresponds to the preliminary read-out image information inside of the irradiation field.

Adjustment of the read-out conditions in the final read-out based on the extracted preliminary read-out image information, i.e. the preliminary read-out image information inside of the irradiation field, may be carried out in various manners. For example, a histogram of the light emission amounts inside of the irradiation field may be created as mentioned above, the maximum light emission amount Smax and the minimum light emission amount Smin of the predetermined image information range may be calculated from the histogram, and the read-out conditions in the final read-out may be adjusted based on Smax and Smin.

The read-out conditions in the final read-out may be adjusted on the basis of only the preliminary read-out image information inside of the irradiation field or by considering also the image recording portion of the object, such as the head, the chest or the abdomen, and the image recording method such as plain image recording, contrasted image recording, tomography or enlargement image recording.

After the read-out conditions in the final read-out are adjusted, the final read-out is conducted by use of the adjusted read-out conditions. In the final read-out, the read-out range should preferably be limited within the irradiation field detected based on the aforesaid method. When the final read-out range is limited within the irradiation field, it is possible to prevent noise components caused by scattered radiation to be stored outside of the irradiation field on the stimulable phosphor sheet from being read out, and to obtain a visible image of a high image quality. Also, since the read-out range is limited, it becomes possible to shorten the read-out time and increase the read-out density.

Figure 9:
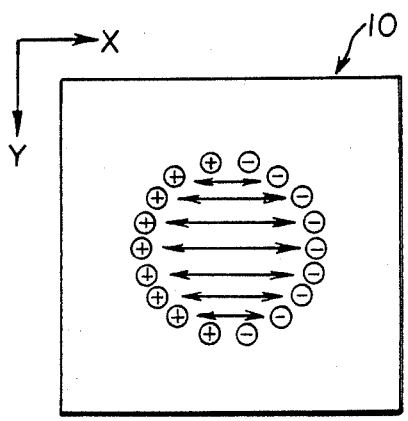
FIG. 9 is a schematic view showing the difference image obtained when the irradiation field is limited to a circular shape.

FIG. 9 shows a threshold value-processed difference image created in the same manner as described with reference to FIGS. 3A to 3F in the case where the irradiation field is limited to a circular form. As is clear from FIG. 9, the method of the present invention is also applicable to the cases where the irradiation field is limited to a shape other than the rectangular shape. Even in the case of subdivision image recording wherein the image recording region on a single stimulable phosphor sheet is divided into a plurality of subdivisions and image recording is conducted on the respective subdivisions, it is possible to adjust the read-out conditions in the final read-out for the respective subdivisions to appropriate values by applying the method of the present invention, for example, to the respective subdivisions.

In the aforesaid embodiment, the difference image is scanned in a single direction to detect the predetermined section. The scanning direction is not necessarily arbitrary and is fixed by the manner of calculating the difference values as will be understood from the foregoing descriptions.

It is also possible to adjust the image processing conditions in the aforesaid image processing on the basis of the preliminary read-out image information at the predetermined sections on the respective scanning lines detected by the aforesaid embodiment of the method of adjusting radiation image read-out conditions in accordance with the present invention.

Another embodiment of the method of adjusting radiation image read-out conditions in accordance with the present invention will now be described below.

In this embodiment, after the digital image signals at the respective positions on the stimulable phosphor sheet 10 are detected as described with reference to FIGS. 1 and 2, a difference image is created by conducting a difference processing on the image signals. The difference processing may be conducted in a single direction for calculating the difference values between the digital image signals only in a single direction, for example, by using the difference operators as shown in FIGS. 3A, 3B, 3C and 3D. Or, the difference processing may be conducted in two or more directions for calculating the difference values between the digital image signals in two or more directions, for example, by using the difference operators as shown in FIGSS. 3E and 3F. The number of the difference images created by conducting the difference processing in two or more directions is not necessarily limited to one, and a plurality of the difference images may be created. For example, in the case where the difference image is created by carrying out the difference processing in two directions, a single difference image may be created by using the difference operator as shown in FIG. 3E or 3F, or two difference images may be created respectively by using the difference operator as shown in FIG. 3A and the difference operator as shown in FIG. 3C.

In this embodiment, the difference processing is conducted in two directions to create a difference image (a difference image in the X axis direction) constituted by difference values at all positions by use of the difference operator as shown in FIG. 3A, and a difference image (difference image in the Y axis direction) constituted by difference values at all positions by use of the difference operator as shown in FIG. 3C.

Thereafter, a predetermined threshold value Th is prepared, the difference image thus created or a processed difference image obtained by appropriately processing the difference image is scanned in two directions which are not parallel to each other, and should preferably be normal to each other. In this manner, a predetermined range formed by a group of predetermined sections intercepted between a position where a difference value equal to or larger than $+Th$ is present and a position where a difference value equal to or smaller than $-Th$ is present on respective scanning lines is detected in each of the two scanning lines.

In this embodiment, the predetermined range is detected by using the processed difference image. Specifically, the aforesaid threshold value processing with the predetermined threshold value Th is carried out on the difference image in the X axis direction and the difference image in the Y axis direction created as described above, thereby encoding the difference values into the three-valued system $(-1, 0, +1)$. The processed difference image in the X axis direction and the processed difference image in the Y axis direction thus obtained by the threshold value processing and constituted by the threshold value-processed difference values thus encoded are respectively scanned in the X axis direction and in the Y axis direction. A group of predetermined sections intercepted between +1 and −1 on the respective scanning lines in the X axis direction is detected as the predetermined range in the X axis direction. Also, a group of predetermined sections intercepted between +1 and −1 on the respective scanning lines in the Y axis direction is detected as the predetermined range in the Y axis direction.

Figure 10:
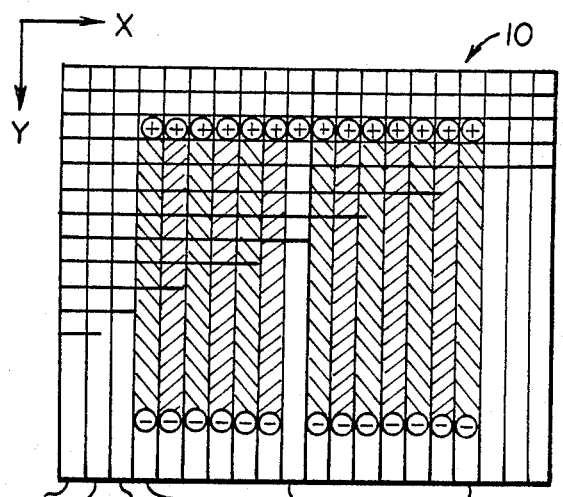
FIGS. 10 and 11 are schematic views showing the processed difference images obtained by a threshold value processing of difference images respectively created by use of the difference operators shown in FIGS. 3C and 3E.

The threshold value-processed difference image in the X axis direction obtained with the difference operator shown in FIG. 3A by conducting the threshold value processing on all scanning lines in the X axis direction and constituted by the threshold value-processed difference values (−1, 0, +1) becomes as shown in FIG. 6. FIG. 10 shows the threshold value-processed difference image in the Y axis direction obtained in the same manner by using the difference operator shown in FIG. 3C.

Detection of the predetermined range formed by a group of the predetermined sections indicated by hatching in FIG. 6 and intercepted between the position where the difference value is equal to or larger than +Th and the position where the difference value is equal to or smaller than −Th on the respective scanning lines LX1, LX2, LX3, ..., LXi, ..., LXn as shown in FIG. 6 by scanning said difference image in the X axis direction, in the scanning direction along the X axis, is equivalent to detection of the range corresponding to the irradiation field. This also applies to the detection of the predetermined rang formed by a group of the predetermined sections on the respective scanning lines LY1, LY2, LY3, ..., LYi, ..., LYn as shown in FIG. 10 by scanning said difference image in the Y axis direction, in the scanning direction along the Y axis.

In this embodiment, two difference images are created by using the difference operators shown in FIGS. 3A and 3C, and respectively scanned in one direction to effect the difference image scanning in two directions and detect two predetermined ranges.

Creation of two difference images may also be carried out, for example, by using the difference operators shown in FIGS. 3B and 3D. Also when the difference values are calculated by using the difference operators shown in FIGS. 3B and 3D and subjected to the aforesaid threshold value processing, difference images similar to those shown in FIGS. 6 and 10 are obtained. Therefore, the predetermined ranges may be detected by scanning the difference images respectively in the X axis direction and in the Y axis direction in the same manner as described above.

Figure 11:
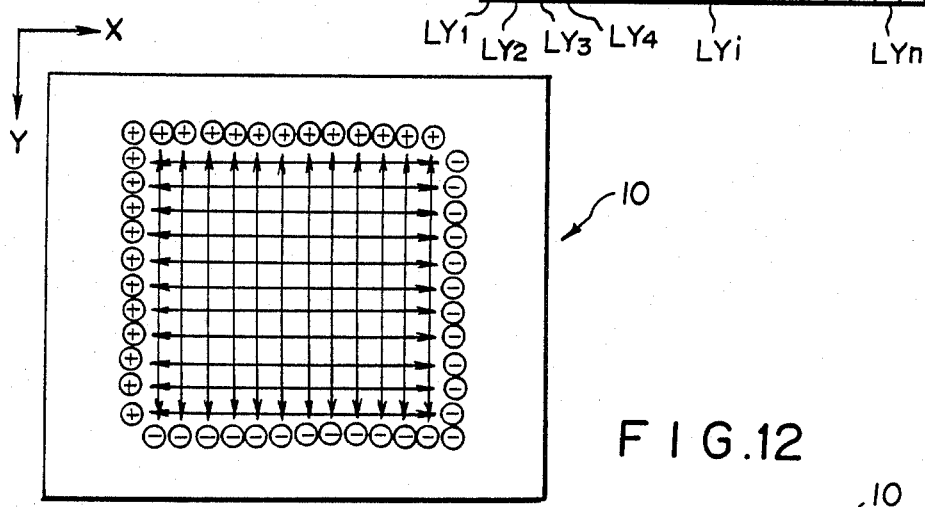

Alternatively, only a single difference image may be created and scanned in two directions to detect two predetermined ranges. For example, a difference image may be created by using the difference operator shown in FIGS. 3E or 3F and subjected to the threshold value processing. In this case, a threshold value-processed difference image as shown in FIG. 11 is obtained. Therefore, the difference image may be scanned in the X axis direction and in the Y axis direction to detect two predetermined ranges.

In FIG. 11, the arrows in the X axis direction and in the Y axis direction respectively indicate the predetermined sections on the respective scanning lines detected by scanning in the X axis direction and in the Y axis direction. The group of the predetermined sections indicated by the arrows in the X axis direction constitutes the predetermined range detected by the scanning in the X axis direction, and the group of the predetermined sections indicated by the arrows in the Y axis direction constitutes the predetermined range detected by the scanning in the Y axis direction.

Also in this embodiment, the threshold value processing for encoding only a part of the difference values may be employed, and the threshold value-processed difference image constituted by the processed difference values obtained by said threshold value processing may be scanned to detect the predetermined ranges.

After the predetermined ranges in the respective scanning directions are detected, the irradiation field region is determined based on the predetermined ranges. For this purpose, two methods as described below may be used.

In a first method, the total region of the predetermined ranges is determined as the irradiation field region. In a second method, the portion common to the predetermined ranges is determined as the irradiation field region.

Figure 12:
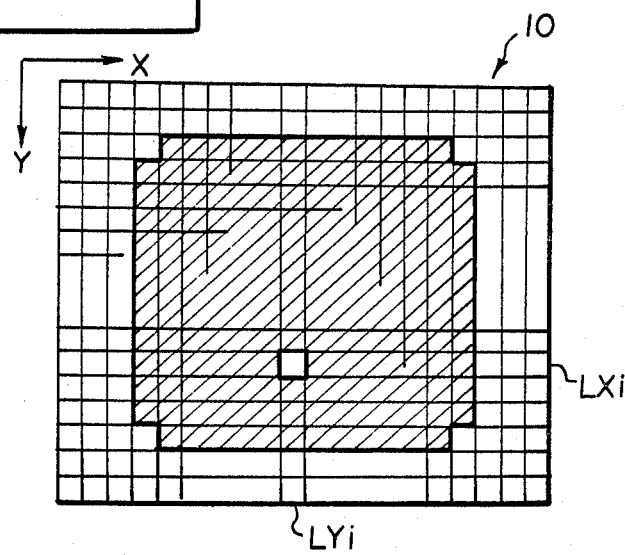
FIG. 12 is a schematic view showing the irradiation field region.

By "total region of predetermined ranges" is meant the region formed by clustering the predetermined ranges. In this case, even a portion belonging only to either one of the predetermined ranges is regarded as a part of the irradiation field region. Specifically, in the case where the predetermined range in the X axis direction as indicated by hatching in FIG. 6 and the predetermined range in the Y axis direction as indicated by hatching in FIG. 10 are detected, the range indicated by hatching in FIG. 12 formed by combining the two predetermined ranges is determined as the irradiation field region. In the case where the irradiation field region is determined based only on the predetermined range detected by the scanning in a single direction and a line on which no predetermined section is detected like the line LXi in FIG. 6 or the line LYi in FIG. 10 is present, the problem arises that the undetected predetermined section which should be regarded as a part of the irradiation field region is not detected as a part of the irradiation field region. However, when the total region of the predetermined ranges detected by the scanning in two directions is determined as the irradiation field region as in this embodiment, the aforesaid problem does not arise, and it becomes possible to determine the range, which covers almost all of the area of the part corresponding to the irradiation field region, as the irradiation field region, though the intersection of the line LXi with the line LYi is missed as shown in FIG. 12.

Figure 13:
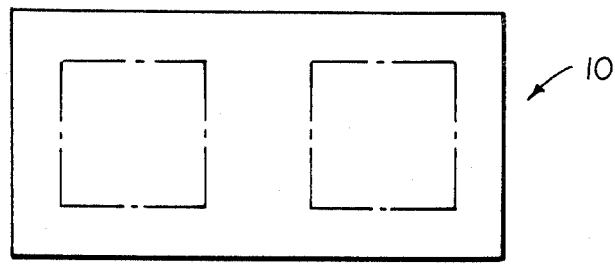
FIG. 13 is a schematic view showing the stimulable phosphor sheet carrying radiation images stored thereon by subdivision image recording.
Figure 14:
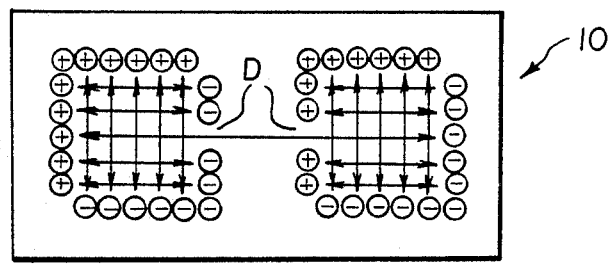
FIG. 14 is a schematic view showing the processed difference images obtained by a threshold value processing in the case of the stimulable phosphor sheet shown in FIG. 13, FIGS. 15A and 15B are schematic views showing the processed difference images obtained by a threshold value processing in the case where the irradiation field is limited to a circular shape.

On the other hand, by "portion common to predetermined ranges" is meant the portion belonging to both predetermined ranges. In this case, a portion belonging only to either one of the predetermined ranges is not regarded as a part of the irradiation field region. This method is suitable for the case of the subdivision image recording wherein, as shown in FIG. 13, the stimulable phosphor sheet 10 is divided into two subdivisions and image recording is conducted at the respective subdivisions by limiting the irradiation field. Specifically, in the case of the subdivision image recording, the threshold value-processed difference image created in the same manner as in FIG. 11 may become incomplete, i.e. positions D, D which should be encoded as $\ominus$ and $\oplus$ may not become $\ominus$ and $\oplus$. In such a case, the predetermined sections (predetermined range) detected by scanning the difference image in the X axis direction become as indicated by the double directed arrows in the X axis direction (in this case, scanning is conducted from left to right in the X axis direction, only the $\oplus \rightarrow \ominus$ section is detected as the predetermined section, and the $\ominus \rightarrow \oplus$ section is not detected), and the predetermined sections (predetermined range) detected by the scanning in the Y axis direction become as indicated by the double directed arrows in the Y axis direction. When the combination of the predetermined ranges is determined as the irradiation field region, the portion which does not belong to the irradiation field region (the portion between the positions D, D) is regarded as a part of the irradiation field region. However, when only the portion common to the predetermined ranges in the two scanning directions is determined as the irradiation field region as with this method, the portion which does not belong to the irradiation field region is eliminated, and it is possible to determine only the portion, which corresponds to the irradiation field, as the irradiation field region.

After the irradiation field region is determined in this manner, the preliminary read-out image information inside of the irradiation field region is extracted from the aforesaid preliminary read-out image information, and the read-out conditions in the final read-out are adjusted based on the extracted preliminary read-out image information in the same manner as mentioned above.

Figure 15A:
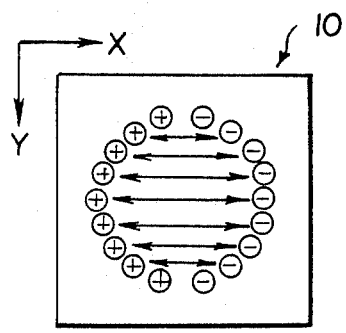
Figure 15B:
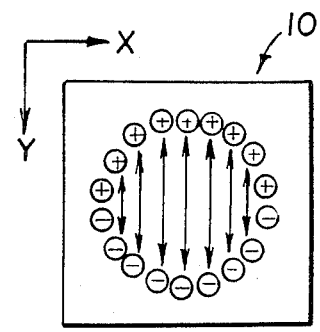

FIGS. 15A and 15B show the threshold value-processed difference images created in the same manner as described with reference to FIGS. 6 and 10 in the case where the irradiation field is limited to a circular form. As is clear from FIGS. 15A and 15B, this embodiment is also applicable to the cases where the irradiation field is limited to a shape other than the rectangular shape.

Figure 16A:
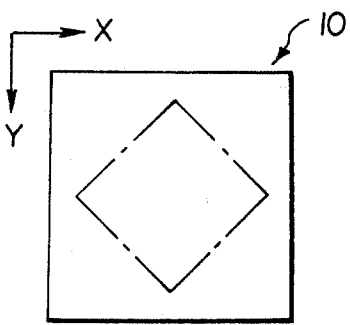
FIG. 16A is a schematic view showing the stimulable phosphor sheet carrying a radiation image stored thereon by limitation of the irradiation field into an oblique rectangular shape.
Figure 16B:
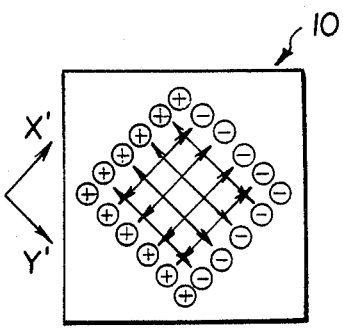
FIG. 16B is a schematic view showing the processed difference image obtained by a threshold value processing in the case of the stimulable phosphor sheet shown in FIG. 16A.

FIG. 16A shows the stimulable phosphor sheet 10 carrying a radiation image stored thereon by limiting the irradiation field to an oblique rectangular form. In this case, the difference operator as shown, for example, in FIG. 3A may be used to calculate the difference values in the X axis direction and create a difference image, and the threshold value processing as described with reference to FIG. 6 may be conducted on the difference image. Thus a threshold value-processed image as shown in FIG. 16B is obtained. The difference image is scanned in the X' axis direction and in the Y' axis direction shown in FIG. 16B to detect the predetermined ranges in the respective directions.

In the case of the subdivision image recording, it is also possible to apply the method of the present invention to the respective subdivisions on the stimulable phosphor sheet by obtaining the information on the subdivision image recording in advance.

It is also possible to adjust the image processing conditions in the aforesaid image processing on the basis of the preliminary read-out image information within the irradiation field determined by this embodiment.

In the present invention, the concept of the difference value and the difference processing also embraces the concept of differentiated value and differentiation processing.

I claim:

1. A method of adjusting radiation image read-out conditions in which preliminary read-out conducted by exposing a stimulable phosphor sheet carrying a radiation image of an object stored thereon by limitation of an irradiation field to stimulating rays of a level lower than the level of stimulating rays used in final read-out and detecting the radiation image stored on the stimulable phosphor sheet is carried out prior to the final read-out wherein the stimulable phosphor sheet is exposed to stimulating rays which cause the stimulable phosphor sheet to emit light in proportion to the stored radiation energy and the emitted light is photoelectrically detected to obtain electric image signals used for reproducing a visible image, and read-out conditions in the final read-out are adjusted on the basis of the image information obtained by the preliminary read-out, wherein the improvement comprises the steps of:
   (i) detecting digital image signals at respective positions on said stimulable phosphor sheet on the basis of the image information obtained by said preliminary read-out,
   (ii) subjecting said digital image signals to a difference processing for calculating differences between said digital image signals, and creating a difference image constituted by the difference values,
   (iii) preparing a predetermined threshold value Th, scanning said difference image or a processed difference image, which is obtained by subjecting said difference image to a predetermined processing, in a single scanning direction, thereby detecting a predetermined section intercepted between a position where a difference value equal to or larger than +Th is present and a position where a difference value equal to or smaller than −Th is present on each scanning line, and
   (iv) adjusting said read-out conditions in said final read-out on the basis of the image information obtained within said predetermined section on each scanning line by said preliminary read-out.

2. A method as defined in claim 1 wherein said processed difference image obtained by subjecting said difference image to a predetermined processing is a threshold value-processed difference image obtained by subjecting said difference image to a threshold value processing for encoding all or a part of said difference values so that the difference value equal to or larger than +Th, the difference value equal to or smaller than −Th, and the other difference values are discriminable.

3. A method of adjusting radiation image read-out conditions in which preliminary read-out conducted by exposing a stimulable phosphor sheet carrying a radiation image of an object stored thereon by limitation of an irradiation field to stimulating rays of a level lower than the level of stimulating rays used in final read-out and detecting the radiation image stored on the stimulable phosphor sheet is carried out prior to the final read-out wherein the stimulable phosphor sheet is exposed to stimulating rays which cause the stimulable phosphor sheet to emit light in proportion to the stored radiation energy and the emitted light is photoelectrically detected to obtain electric image signals used for reproducing a visible image, and read-out conditions in the final read-out are adjusted on the basis of the image information obtained by the preliminary read-out, wherein the improvement comprises the steps of:
   (i) detecting digital image signals at respective positions on said stimulable phosphor sheet on the basis of the image information obtained by said preliminary read-out,
   (ii) subjecting said digital image signals to a difference processing for calculating differences between said digital image signals, and creating a difference image constituted by the difference values,
   (iii) preparing a predetermined threshold value Th, scanning said difference image or a processed difference image, which is obtained by subjecting said difference image to a predetermined processing, in at least two scanning directions, thereby detecting a predetermined range formed by a group of predetermined sections intercepted between a position where a difference value equal to or larger than +Th is present and a position where a difference value equal to or smaller than −Th is present on respective scanning lines in each of said at least two scanning directions, and (iv) adjusting said read-out conditions in said final read-out on the basis of the image information obtained by said preliminary read-out within an irradiation field region determined based on the predetermined ranges detected in the respective scanning directions.

4. A method as defined in claim 3 wherein said processed difference image obtained by subjecting said difference image to a predetermined processing is a threshold value-processed difference image obtained by subjecting said difference image to a threshold value processing for encoding all or a part of said difference values so that the difference value equal to or larger than +Th, the difference value equal to or smaller than −Th, and the other difference values are discriminable.

5. A method as defined in claim 3 or 4 wherein the total region of said predetermined ranges detected in the respective scanning directions is determined as said irradiation field region.

6. A method as defined in claim 3 or 4 wherein a portion common to said predetermined ranges detected in the respective scanning directions is determined as said irradiation field region.

* * * * *